United States Patent
Joedicke

(10) Patent No.: US 6,607,781 B2
(45) Date of Patent: Aug. 19, 2003

(54) ROOFING GRANULES WITH A DECORATIVE METALLIC APPEARANCE

(75) Inventor: Ingo B. Joedicke, Falling Waters, WV (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 10/342,766

(22) Filed: Jan. 15, 2003

(65) Prior Publication Data

US 2003/0108668 A1 Jun. 12, 2003

Related U.S. Application Data

(62) Division of application No. 09/852,896, filed on May 10, 2001, now Pat. No. 6,548,145.

(51) Int. Cl.[7] .................................................. B05D 1/24
(52) U.S. Cl. ........................ 427/186; 427/214; 427/215; 427/219; 427/191; 427/192; 427/202; 427/204; 427/205
(58) Field of Search ................................. 427/214, 215, 427/219, 186, 191, 192, 202, 204, 205

(56) References Cited

U.S. PATENT DOCUMENTS

| | | | | | |
|---|---|---|---|---|---|
| 2,001,448 A | * | 5/1935 | Beasley | ...................... | 428/404 |
| RE20,295 E | * | 3/1937 | Fisher | ......................... | 428/145 |
| 2,142,540 A | * | 1/1939 | Veazey | ....................... | 427/219 |
| 2,732,311 A | * | 1/1956 | Hartwright | .................. | 427/186 |
| 2,898,232 A | * | 8/1959 | Miller et al. | ................. | 427/219 |
| 2,981,636 A | * | 4/1961 | Lodge et al. | ................ | 428/404 |
| 2,986,476 A | * | 5/1961 | Larsen | ........................ | 427/219 |
| 3,479,201 A | * | 11/1969 | Sloan | .......................... | 428/145 |
| 3,954,496 A | * | 5/1976 | Batzar | ........................ | 106/404 |
| 5,718,753 A | * | 2/1998 | Suzuki et al. | ................ | 106/403 |
| 6,238,794 B1 | * | 5/2001 | Beesley et al. | .............. | 428/403 |
| 6,548,145 B2 | * | 4/2003 | Joedicke | ..................... | 428/145 |

FOREIGN PATENT DOCUMENTS

NL        150091 B    *   7/1976

OTHER PUBLICATIONS

Vail, "Silicate of Soda in the Building Industry", 1935, Industrial and Engineering Chemistry, vol. 27, No. 8, pp. 888–893.*

* cited by examiner

Primary Examiner—William P. Watkins, III
(74) Attorney, Agent, or Firm—William J. Davis; Imre Balogh

(57) ABSTRACT

Colored roofing granules and methods for their preparations, having decorative metallic appearance and enhanced stability against discoloration of color containing a silica-encapsulated metallic flake or colored lamellar effect pigment distributed in an insolubilized alkali silicate coating.

18 Claims, No Drawings

ROOFING GRANULES WITH A DECORATIVE METALLIC APPEARANCE

This is a division, of application Ser. No. 09/852,896, filed on May 10, 2001, now U.S. Pat No. 6,548,145.

BACKGROUND OF THE INVENTION

1. Field of the Invention

This invention relates to roofing compositions having a decorative metallic appearance. More particularly, the invention relates to roofing granules and to roofing shingles incorporating said granules possessing the characteristics of metallic brilliance, color and stability against discoloration/degradation.

2. Reported Developments

Roofing granules, both natural and artificially color-coated granules, are extensively used in roll roofing and asphalt shingle compositions. The roofing granules are typically embedded in the asphalt coating on the surface of an asphalt-impregnated felt base material, the granules thus forming a coating that provides a weather-resistant exterior roofing surface. In addition to its utility, the granule coating also provides an esthetic effect observable with respect to the coating composition, the appearance of the granules is of major marketing interest. For this reason a pigmented color coating is ordinarily applied to the base mineral granules to enhance their visual, decorative effect. The method of providing artificially colored roofing granules involves crushing and screening minerals and applying to the so-obtained granules a coating containing the desired pigment. The granules and the pigment are bonded together by using a soluble silicate binder solution which is then insolubilized by heat treatment alone or by chemical action to a water-insoluble state. The function of the soluble silicate is to first uniformly distribute and encapsulate the pigment within the coating matrix and then to bind the pigment and granules together when the silicate is insolubilized.

The soluble silicate binder is converted to an insoluble state by heat treatment as in the case of a silicate/clay coating matrix or by a combination of heat treatment and chemical action such as by the addition of an acidic material to the fired soluble silicate.

Exemplary references directed to the production of artificially colored granules and stabilizing the pigment therein are as follows.

U.S. Pat. No. Re. 20,295 describes artificially colored roofing granules produced by: depositing on granular mineral matter a metal salt followed by the addition of a soluble silicate which will react to form an insoluble metal glass; and subjecting the insoluble metal glass to heat in order to fuse the metal silicate on the granules.

U.S. Pat. No. 2,001,448 describes a method of producing artificially colored granules by the steps of: providing base particles, such as sand, gravel, rock, blast-furnace slags, or burned clay or shale and crushed brick; mixing the particles with a hydrous plastic clay in either wet or dry condition so that the clay coats the exterior surfaces of the particles; adding a suitable color pigment to coat the particles therewith; drying the particles; adding silicate of soda either per se or with a coloring pigment therein to react with the clay coating covering the particles; and heating the particles to a temperature of about 450° to 1200° F. to fuse together the coatings and the particles.

U.S. Pat. No. 2,695,851, describes artificially colored roofing granules and a method for producing them. The method comprises: forming on the base granules a coating of film-forming composition which contains a pigment, an alkali silicate solution, finely-divided hydrated alumina, and an insolubilizing agent comprising of clay, cryolite, feldspar, aluminum fluoride and sodium fluorosilicate; and heating the so-obtained granules to about 1000° F.

The hydrated alumina used in combination with a light-colored, opaque pigment, such as titanium dioxide produces lighter and brighter granules than can be produced with titanium dioxide in the absence of hydrated alumina.

U.S. Pat. No. 2,732,311 is directed to a coating process for producing radiation-reflective roofing granules.

In the process the raw granules are mixed with a clay-like material, such as kaolin at a temperature below 100° F., preferably at room temperature. A solution of sodium silicate is added to the mixture. Alternatively, the clay and sodium silicate can be pre-mixed then applied to the granules. The granules are then partially air-dried to develop a tacky film on the granules. When the proper viscous tacky film has been formed, aluminum flakes are then added to the mixture and are caused to adhere to the coated granules by further mixing. Instead of aluminum flakes, copper flakes, brass flakes, or metallic particles known as bronze powders and aluminum bronze may be used. The metal flake-coated granules are then fired at a temperature of about 900° to 1000° F.

U.S. Pat. No. 2,981,636 describes artificially colored roofing granules and a method for their preparation. The method of producing the colored roofing granules involves the steps of:

mixing the cleaned and heated granules with an aqueous solubon of sodium silicate; drying and dehydrating the mixture of granules and the aqueous solution; and adding an insolubilizing agent containing a desired pigment therein to the dehydrated granules.

The insolubilizing agent is a mixture of aluminum chloride and ammonium chloride, however, other insolubilizing agents may also be used, such as aluminum sulfate, magnesium chloride, zinc chloride, and hydrochloric acid.

It is apparent from the prior art that the firing temperature requirements, the highly alkaline coating matrix, and lack of coating transparency have made it difficult to prepare granules having a bright metallic luster. Past attempts have produced colored granules of poor weathering characteristics exhibiting rapid loss of color and metallic luster.

SUMMARY OF THE INVENTION

In the practice of the present invention, highly desirable properties are imparted to roofing granules in a manner providing enhanced metallic brilliance and color and excellent, long-term weathering characteristics.

In one aspect the present invention is directed to the manufacturing of artificially colored roofing granules comprising the steps of:

a) crushing and sizing a base aggregate to the desired size, typically to No. 11 grading;

b) preheating the sized/graded granules to about 175–190° F.;

c) preparing a coating composition comprising: water, alkali silicate solution, and a silica-encapsulated metallic flake pigment in either powder or aqueous paste form, or a lamellar effect pigment such as a metal oxide-coated mica;

d) combining the preheated, sized/graded granules and the coating composition in "c" above by mixing to produce individually coated granules;

e) pre-drying the individually coated granules to reduce their moisture content to about 0.1%–0.5%;

f) kiln-firing the granules at about 400° F. to form a transparent, partially insolubilized coating on the granules in which the metallic flake pigments are uniformly distributed;

g) cooling the granules to reduce their temperature to about 140–160° F. by means of air flow and water spray application;

h) applying together with the water spray application a 28% aluminum chloride solution at a rate of about 12–16 pounds per ton (hereinafter sometimes termed as PPT) to the coated granules to allow chemical reaction to occur between the aluminum chloride and the alkali silicate to complete insolubilization; and i) treating the coated granules with a mixture of process oil and an organosilicon compound to impart dust control, and to improve adhesion to a substrate, such as asphalt.

The base aggregate can be either untreated base aggregate or granules that have been colored by a conventional high-temperature silicate/clay coating process.

Optionally, the metallic flake pigment can be used in powdered form in conjunction with water. However, there is a significant safety advantage in using aluminum in aqueous paste from, as well as silica-encapsulated, to reduce the chance of dust ignition. With lamellar effect pigments consisting of doped metal oxide flakes or metal oxide-coated mica, however, there is no ignition hazard, so they could be used in the dry commercially available form.

In another aspect the present invention is directed to the manufacturing of artificially colored roofing granules coated on a substrate or carrier. The loadings in pounds per ton (ppt) base granules comprise:

|  | Range | Preferred Range |
| --- | --- | --- |
| Water | 14.6–73.1 | 41.5–46.2 |
| Alkali Silicate Solution | 15.0–75.0 | 40.0–50.0 |
| 65% Solids Metallic Pigment Paste | 15.4–76.9 | 38.5–53.8 |

Alternatively, if dry basis pigments are used, the loadings in pounds per ton (ppt) base granules comprise:

|  | Range | Preferred Range |
| --- | --- | --- |
| Water | 20.0–100 | 55.0–65.0 |
| Alkali Silicate Solution | 15.0–75 | 40.0–60.0 |
| Metallic Pigment Powder | 10.0–50 | 25.0–35.0 |

The preferred alkali silicate is sodium silicate of $SiO_2/Na_2O$ weight ratio of 3.2 to maximize the extent of dehydration and insolubilization at the low temperature of about 400° F. firing to produce as transparent coating as possible. This helps highlight the reflective/decorative characteristics of the metallic flake or lamellar effect and reduces tarnishing of the metal surface during the granule manufacturing process.

For achieving special color effects in roof granules, a two-coat product is made which comprises a high-temperature pigmented first coat and a second coat described above. For granules with the appearance of metallic aluminum, the first coat preferably is a white or light gray base which extends the bright silvery metallic appearance of the second coat.

DETAILED DESCRIPTION OF THE INVENTION

Roofing granules are extensively used in roll roofing and asphalt shingle products. The roofing granules are generally embedded in the asphalt coating on the surface of the asphalt-impregnated felt base material, the granules thus forming a protective layer to shield the asphalt from the actinic rays of the sun. As this outer granule layer also provides an observable esthetic effect, the appearance of the granules is of major marketing interest. For this reason, a pigmented color coat is typically applied to the base mineral granules to enhance their visual, decorative effect.

Methods for artificial coloring of roofing granules involve crushed and screened minerals in which the granules are coated with a pigment of choice in a silicate matrix. The coating composition contains a soluble alkali silicate binder which is insolubilized by heat treatment or by chemical action or a combination thereof. Insolubilization by chemical action typically involves the addition of an acidic material to the soluble alkali silicate after heat treatment.

The prior art has provided artificially colored granules with metallic appearance which in some cases had high intensity of color and brightness for a limited time period when applied onto a substrate, such as asphalt coated roof shingles. Upon extended weathering, however, the colored granules have lost their brilliance and tarnished.

It is a main object of the present invention to provide roofing surfaces having bright metallic colors and enhanced resistance to discoloration during extended time periods of exposure to atmospheric weathering. The present invention is hereinafter set forth in detail regarding its main object and its other characteristics.

The component parts of the process/product of the present invention include:

the substrate or carrier onto which the colored granules are coated;

the coating on the granules and;

treatment conditions of heat and chemical reagents.

Substrate or Carrier

The substrate or carrier used in the present invention is well-known in the art and includes an organic asphalt-saturated felt base to receive an outer surface coating thereon.

Granules

Any suitable base raw mineral granules commonly employed, such as greenstone, rhyolite, andesite, basalt, and nephaline syanite can be used in the present invention. While uncolored granules can be used, artificially colored granules, which are commonly employed by the building material industry, can be another source of the starting material. With respect to the artificially colored granules, an alkali metal silicate-clay coating is applied to the base mineral granules and fired to produce a substantially water-insoluble, pigmented coating on the base mineral granules.

As in the above alkali metal silicate-clay coating, the granules may be rendered colored by using various pigments, such as red iron oxide, yellow iron hydrate, titanium dioxide, chrome hydrate, chrome oxide, chrome green, ultramarine blue, phthalocyanin blue and green and carbon black.

As white or light-colored roofs are particularly preferred, titanium dioxide pigment is preferred to provide a supporting background in the first coat of the present invention.

An illustrative process of making colored roofing granules comprises the steps of:

a) crushing and sizing the base aggregate to the desired size, typically to No. 11 grading;

b) pre-heating the sized/graded granules to about 210°–230° F.;

c) coating the pre-heated granules with a ceramic composition being in the form of aqueous slurry comprising: alkali silicate, preferably sodium silicate, Kaolin clay and pigment;

d) pre-drying the coated granules to adjust their moisture content to about 0.2% to 0.5% w/w; and e) kiln-firing the granules at a temperature of from about 940° F. to about 960° F. to form an insolubilized silicate-clay matrix coating.

The ceramic composition in aqueous form typically comprises the following expressed in pound per ton, of base mineral aggregate (corresponding approximately to one gram per two kilogram):

| | |
|---|---|
| Water | 40 |
| Sodium Silicate Solution | 75 |
| (38% w/w solids, $SiO_2/Na_2O$ = 2.9) | |
| Kaolin clay | 35 |
| Pigment | 0.1–10 |

These components are combined in a slurry by using a suitable mixing equipment. The slurry is then applied to the pre-heated granules in a suitable apparatus and kiln-fired to form the insolubilized silicate-clay matrix coating on the granules.

The above-described process provides a first inner color coating on the roofing granules which subsequently is covered by a second outer coating of decorative metallic appearance. It is to be noted that when the second outer coating is directly applied to non-colored crushed and sized granules, the second coating denotes the only coating applied to such granules.

In asphalt roofing compositions the colored granules are employed in commercially established quantities, e.g. generally on the order of about 35 pounds of granules per square or 100 ft$^2$ of shingle butt portion. The exact amount of granules employed may vary depending on the particular operations of a given roofing manufacturer, the particular shingle or other roofing product involved and other pertinent factors relating to any specific roofing operation.

Metallic Pigments

The most effective metallic pigments for use in the present invention are high-brightness aluminum, copper, or copper alloy flakes that have been silica-encapsulated to enhance chemical resistance. Examples of commercially available metallic flakes in powder or aqueous paste form include:

Eckart PCR212, which is a high-brightness, silica encapsulated, non-leafing aluminum flake of 48 micron average particle size;

Eckart Standard Resist Sillux 501, a 21-micron double silica-encapsulated aluminum flake;

Eckart Sillux 8154, a 17-micron high durability aluminum flake;

Eckart Standard Resist AT, which is a silica-encapsulated copper flake of 15 micron average particle size; and Eckart Standard Resist AT/AM Rich Pale Gold Bronze, which is a high-durability, double-encapsulated, copper/zinc alloy flake of 15-micron average particle size.

Lamellar Effect Pigments

In place of the above-described metallic pigments, brilliant colored metallic effects can be obtained with unique lamellar effect pigments that are commercially available. Exemplary lamellar effect pigments include Sicolux products available from BASF, such as: Sicolux L3015 copper gloss which consists of lamellae of iron oxide doped with aluminum and manganese oxides, and has the appearance of metallic copper; and Sicolux L6015 metal gloss which is a reduced titanium dioxide-coated pigment with a gunmetal blue appearance.

Performance Evaluation Data

Example A

1) White base-coated granules (first coat)

In the pilot plant, 2000 gm Rhyolite aggregate of No. 11 grading was pre-heated to 175° F.–190° F. and then coated with the following mixture:

| | |
|---|---|
| Water | 13.6 gm |
| Sodium Silicate Solution | 40.0 gm |
| (38% w/w solids, $SiO_2/Na_2O$ = 3.22) | |
| Sodium Silicate Solution | 10.0 gm |
| (44% w/w solids, $SiO_2Na_2O$ = 2.00) | |
| Titanium dioxide | 5.0 gm |
| Kaolin clay slurry (70% solids) | 71.4 gm |

The coated granules were dried with a hot air gun until free flowing and then fired in a rotary kiln at 950° F. The fired granules were allowed to cool to ambient temperature in preparation for the second coat application.

2) Second coat 2000 gm of the white base-coated granules prepared above (1) were preheated to 175° F.–190° F. and then coated with the following mixture:

| | |
|---|---|
| Water | 60 gm |
| Sodium Silicate Solution | 45 gm |
| (38% w/w solids, $SiO_2/Na_2O$ = 3.22) | |
| Eckart PCR 212 Aluminum Pigment | 30 gm |

The coated granules were dried with a hot air gun until free flowing and then fired in a rotary kiln at 400° F. The fired granules were allowed to cool to ambient temperature and then treated with 12–16 gm of a 28% w/w aluminum chloride solution diluted with an equal volume of water. The granules were again heat-gun dried and then post-treated with a mixture of 3.8–3.9 gm process oil containing 0.075 gm siloxane ready to be embedded in an asphalt-coated substrate.

Standard Laboratory quality testing showed that granules with this type of aluminum coating exhibit a kiln alkalinity of 40–50 ml, which drops to 15–25 ml after application of the aluminum chloride solution. This refers to ml of 0.1 HCl needed to neutralize the aqueous leachate after 18 hrs of Soxhlet extraction of a 40 gm granules sample. The drop in alkalinity after aluminum chloride treatment indicates that an acceptable level of coating insolubilization has been achieved. When finished, granule quality tests of water repellency, asphalt affinity, and stain resistance were all acceptable and comparable to those of other standard roofing granules products.

The aluminum-coated granules having the first and second coat thereon were applied to an asphalt-coated aluminum panel and placed in an Atlas Ci 4000 Controlled Irradiance Xenon Arc Weatherometer set to simulate accelerated South Florida exposure conditions. After 10,000 hours of weatherometer exposure, the aluminum-coated granules retained a high level of metallic brilliance.

The use of aluminum pigments that were not silica-encapsulated, or the use of coating compositions or processing conditions other than those specified above, typically produced granules whose metallic brilliance tarnished in less than 2,000 hours of weatherometer exposure time.

The aluminum-coated granules of this example were also applied to asphalt-coated Aluminum panels and placed on exposure at outdoor weathering sites in both Western Maryland and South Florida. At both locations, after more than 2 years exposure, the granules still retained a high level of metallic brilliance.

In contrast, granules made with aluminum pigments that were not silica-encapsulated, or those made by not using the preferred coating/processing parameters lost significantly more brilliance during the same weathering period.

Example B

In the pilot plant, 2000 gm of Rhyolite aggregate of No. 11 grading was preheated to 175° F.–190° F. and then coated with the following mixture:

| | |
|---|---|
| Water | 60 gm |
| Sodium Silicate Solution (38% w/w solids, $SiO_2Na_2O$ = 3.22) | 45 gm |
| BASF Sicolux L 3015 (Copper Gloss Lamellar Effect Pigment) | 30 gm |

The coated granules were dried with a hot air gun until free-flowing and then fired in a rotary kiln at 400° F. The fired granules were allowed to cool to ambient temperature and then treated with 12–16 gm of a 28% aluminum chloride solution diluted with an equal volume of water. The granules were again heat-gun dried and then post-treated with a mixture of 3.8–3.9 gm process oil containing 0.075 gm siloxane ready to be embedded in an asphalt-coated substrate.

The finished granules had the appearance of shiny metallic copper. The simulated "copper" granules were applied to an asphalt-coated aluminum panel and placed in an Atlas Ci 4000 Controlled Irradiance Xenon Arc Weatherometer set to simulate accelerated South Florida exposure conditions. After 3,200 hours of weatherometer exposure, the simulated "copper" granules still retained a high level of metallic brilliance. In contrast, granules made with copper flake pigments, which were not silica-encapsulated, typically developed a significant level of tarnish after only a few hundred hours of weatherometer exposure time.

Although the invention has been described in terms of specific embodiments which are set forth in considerable detail, it should be noted that the invention is not limited thereto since alternative embodiments and operating techniques will become apparent to those skilled in the art. Accordingly, modifications are contemplated which can be made without departing from the spirit of the described invention.

What is claimed is:

1. A method of preparing colored roofing granules having a decorative metallic appearance and enhanced stability against degradation of color upon exposure to atmospheric conditions comprising the steps of:
   a) crushing and sizing a base mineral aggregate to form granules therefrom;
   b) preheating the granules to about 175–190° F.;
   c) preparing a coating composition comprising: water, an alkali silicate solution, and a silica-encapsulated metallic flake pigment in either powder or aqueous paste form;
   d) combining said preheated granules and said coating composition by mixing to produce individually coated granules;
   e) predrying said individually coated granules to reduce their moisture content to about 0.1%–0.5%;
   f) kiln-firing said granules at about 400° F. to form a transparent, partially insolubilized coating on the granules;
   g) cooling said granules to reduce their temperature to about 140–160° F. by means of air flow and water spray application;
   h) applying along with the water spray application an aluminum chloride solution to said granules to allow chemical reaction to occur between the aluminum chloride and the alkali silicate to complete insolubilization of said coating; and
   i) treating said granules having the insolubilized coating thereon with a mixture of process oil and an organo-silicon compound to impart dust control, and to improve adhesion to a substrate.

2. The method of claim 1 wherein said alkali silicate having the formula $M_2O$. x $SiO_2$ wherein x=3.2 for M=Na, and x=2.5 for M=K.

3. The method of claim 2 wherein said alkali silicate has the $SiO_2/Na_2O$ weight ratio of 3.22:1.

4. The method of claim 1 wherein said alkali silicate is sodium silicate or potassium silicate.

5. The method of claim 1 wherein said metallic flake pigment is selected from the group consisting of: aluminum, copper, copper alloy, lamellar effect pigments and mixtures thereof.

6. A method of preparing roofing shingles consisting of a substrate and colored roofing granules embedded in the substrate wherein said colored roofing granules having a decorative metallic appearance and enhanced stability against degradation of color upon exposure to atmospheric conditions comprising the steps of:
   a) crushing and sizing a base mineral aggregate to form granules therefrom;
   b) preheating the granules to about 175–190° F.;
   c) preparing a coating composition comprising: water, an alkali silicate solution, and a silica-encapsulated metallic flake pigment in either powder or aqueous paste form;
   d) combining said preheated granules and said silica-encapsulating paste by mixing to produce individually coated granules;
   e) predrying said individually coated granules to reduce their moisture content to about 0.1%–0.5%;
   f) kiln-firing said granules at about 400° F. to form a transparent, partially insolubilized coating on the granules;
   g) cooling said granules to reduce their temperature to about 140–160° F. by means of air flow and water spray application;
   h) applying along with the water spray application an aluminum chloride solution to said granules to allow chemical reaction to occur between the aluminum chloride and the alkali silicate to complete insolubilization of said coating; and i) treating said granules having the insolubilized coating thereon with a mixture of process oil and an organosilicon compound to impart dust control, and to improve adhesion to a substrate; and j) coating said substrate with said colored granules.

7. The method of claim 6 wherein said substrate comprises an organic asphalt saturated felt material.

8. A method of preparing colored roofing granules having a decorative metallic appearance and enhanced stability against degradation of color upon exposure to atmospheric conditions comprising the steps of:

a) crushing and sizing a base mineral aggregate to form granules therefrom;

b) preheating said granules to about 175–190° F.;

c) coating said preheated granules with an aqueous mixture comprising: an alkali silicate, a pigment and Kaolin clay;

d) drying said coated granules to reduce their water content;

e) kiln-firing said granules to about 950° F.;

f) cooling said kiln-fired granules to about 175° F.–190° F.;

g) preparing a coating composition comprising: water, an alkali silicate solution, and a silica-encapsulated metallic flake pigment in either powder or paste form;

h) combining said preheated granules having the temperature of about 175°–190° F. and said coating composition by mixing to produce individually coated granules;

i) predrying said individually coated granules to reduce their moisture content to about 0.1%–0.5%;

j) kiln-firing said granules at about 400° F. to form a transparent, partially insolubilized coating on the granules;

k) cooling said granules to reduce their temperature to about 140–160° F. by means of air flow and water spray application;

l) applying along with the water spray application an aluminum chloride solution to said granules to allow chemical reaction to occur between the aluminum chloride and the alkali silicate to complete insolubilization of said coating; and m) treating said granules having the insolubilized coating thereon with a mixture of process oil and an organosilicon compound to impart dust control, and to improve adhesion to a substrate.

9. The method of claim 8 wherein said alkali silicate having the formula of $M_2O \cdot x\ SiO_2$ wherein $x=3.2$ for $M=Na$, and $x=2.5$ for $M=K$.

10. The method of claim 9 wherein said alkali has the $SiO_2/Na_2O$ weight ratio of 3.22:1.

11. The method of claim 8 wherein said alkali silicate is sodium silicate or potassium silicate.

12. The method of claim 8 wherein said metallic flake pigment is selected from the group consisting of: aluminum, copper, copper alloy, lamellar effect pigments and mixtures thereof.

13. A method of preparing roofing shingles consisting of a substrate and colored roofing granules embedded in the substrate wherein said colored roofing granules having a decorative metallic appearance and enhanced stability against degradation of color upon exposure to atmospheric conditions comprising the steps of:

a) crushing and sizing a base mineral aggregate to form granules therefrom;

b) preheating the granules to about 175–190° F.;

c) coating said preheated granules with a first or inner coating matrix of alkali silicate solution comprising: a high silica content alkali silicate, a pigment and Kaolin clay;

d) drying said coated granules to reduce their water content;

e) kiln-firing said granules to about 950° F.;

f) cooling said kiln-fired granules to about 175° F.–190° F.;

g) coating the kiln-fired granules with a second or outer coating;

h) preparing a coating composition comprising: water, an alkali silicate solution, and a silica-encapsulated metallic flake pigment in either powder or aqueous paste form;

i) combining said kiln-fired granules having a temperature of about 175°–190° F. and said coating composition by mixing to produce individually coated granules;

j) predrying said individually coated granules to reduce their moisture content to about 0.1%–0.5%;

k) kiln-firing said granules at about 400° F. to form a transparent, partially insolubilized coating on the granules;

l) cooling said granules to reduce their temperature to about 140–160° F. by means of air flow and water spray application;

m) applying along with the water spray application an aluminum chloride solution to said granules to allow chemical reaction to occur between the aluminum chloride and the alkali silicate to complete insolubilization of said coating; and n) treating said granules having the insolubilized coating thereon with a mixture of process oil and an organosilicon compound to impart dust control, and to improve adhesion to a substrate; and wherein said substrate comprises an organic asphalt saturated felt material.

14. The method of claim 13 wherein said pigment is titanium dioxide.

15. The method of claim 13 wherein said alkali silicate having the formula of $M_2O \cdot x\ SiO_2$ wherein $x=3.2$ for $M=Na$, and $x=2.5$ for $M=K$.

16. The method of claim 15 wherein said alkali silicate has the $SiO_2/Na_2O$ weight ratio of 3.22:1.

17. The method of claim 13 wherein said alkali silicate is sodium silicate or potassium silicate.

18. The method of claim 13 wherein said metallic flake pigment is selected from the group consisting of: aluminum, copper, copper alloy, lamellar effect pigments and mixtures thereof.

* * * * *